March 2, 1943.  G. W. O'HARE  2,312,473
ADJUSTABLE AIRPLANE SEAT STRUCTURE
Filed Oct. 21, 1940  2 Sheets—Sheet 2
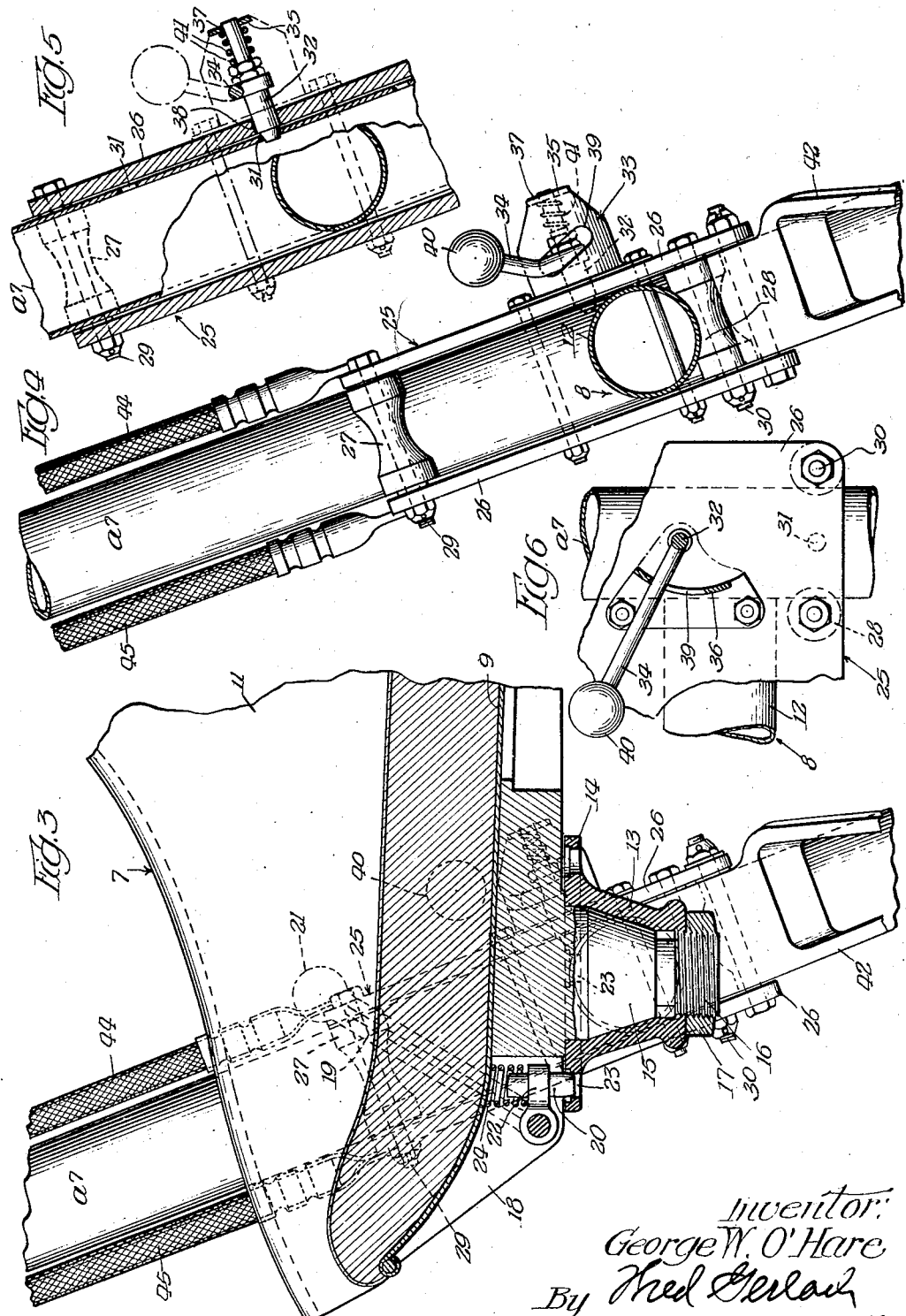
Inventor:
George W. O'Hare
By Fred Gerlach
Atty Patented Mar. 2, 1943

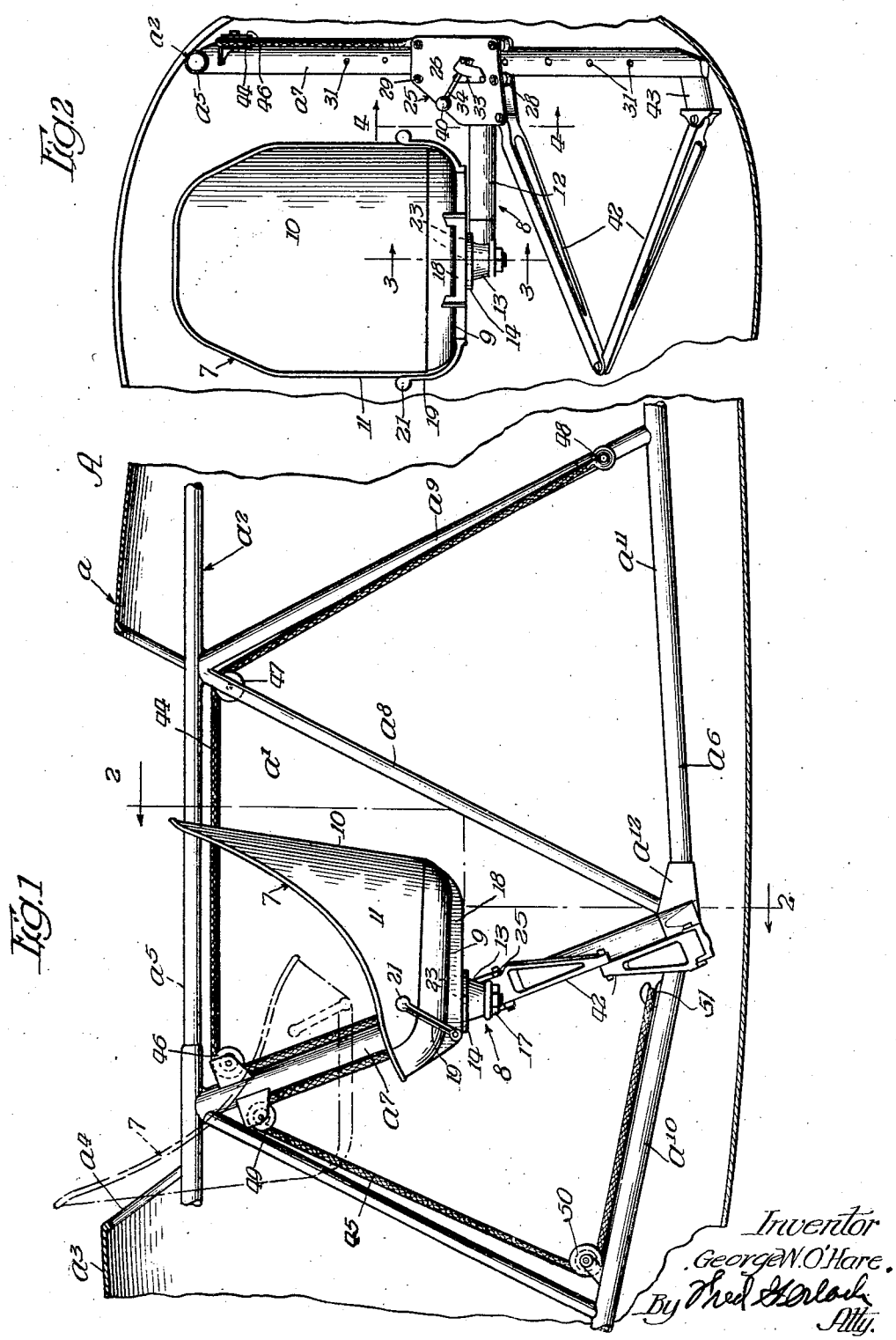

2,312,473

UNITED STATES PATENT OFFICE 2,312,473

ADJUSTABLE AIRPLANE SEAT STRUCTURE

George W. O'Hare, Bellflower, Calif., assignor to Vultee Aircraft, Inc., Downey, Calif., a corporation of Delaware Application October 21, 1940, Serial No. 362,036

11 Claims. (Cl. 244—122)

The present invention relates generally to adjustable seat structures. More particularly the invention relates to that type of seat structure which is used in connection with, and forms part of, the auxiliary or aft cockpit of a military or naval airplane and comprises a seat and in addition a mount whereby the seat may be adjusted vertically and, in addition, turned about a substantially vertical axis in order to permit the user to face forwards, rearwards or sidewards, depending upon whether he desires or proposes to manipulate the controls at the front of the cockpit, or to observe or fire a machine gun in a rearward or sidewise direction.

One object of the invention is to provide a seat structure of this type which is more simple in design and construction than previously designed airplane seat structures and may be adjusted vertically as well as bodily rotated with greater facility.

Another object of the invention is to provide an adjustable airplane seat structure of the type and character under consideration in which the mount is so constructed and arranged that it supports the seat from one side of the cockpit only and thus affords the user of the seat free leg room at the other side of the cockpit in connection with vertical adjustment or turning of the seat.

Another object of the invention is to provide a seat structure of the last mentioned character in which the mount for supporting the seat from one side of the cockpit only comprises a horizontally elongated bracket which underlies, and projects to one side of, the seat and has at its outer end a roller equipped guide member in straddled relation with, and vertically movable on, one of the upstanding structural members of the fuselage of the airplane.

A further object of the invention is to provide a seat structure of the type and character heretofore mentioned which includes (1) novel means for releasably locking the seat in the various positions into which it is turned relatively to the mount, (2) simple and novel means for locking the horizontally elongated bracket in its various vertically adjusted positions, and (3) a pair of pivotally connected torque arms for preventing rotation of the roller equipped guide member relatively to the upstanding structural member on which it is mounted while at the same time permitting vertical sliding movement of the member.

A still further object of the invention is to provide an adjustable airplane seat structure which is generally of new and improved construction and not only may be produced at an extremely low cost but also is light in weight and durable.

Other objects of the invention and the various advantages and characteristics of the present airplane seat structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of the aft cockpit of an airplane having applied thereto a seat structure embodying the invention;

Figure 2 is a vertical transverse section taken on the line 2—2 of Figure 1 and illustrating the seat of the structure in its forward position;

Figure 3 is an enlarged vertical longitudinal section taken on the line 3—3 of Figure 2 and showing in detail the manner in which the seat of the structure is connected to the horizontally elongated bracket of the mount for turning or rotation about a substantially vertical axis and further showing in detail the design and construction of the means for releasably locking the seat in the various positions into which it is turned by the user;

Figure 4 is an enlarged vertical longitudinal section taken on the line 4—4 of Figure 2 and illustrating the construction and design of the roller equipped guide member at the outer end of the horizontally elongated bracket of the mount and showing the manner in which the guide member straddles and is vertically slidably adjustable on the upstanding fuselage structural member with which it is associated;

Figure 5 is an enlarged vertical longitudinal section illustrating in detail the construction, design and arrangement of the means for releasably locking the roller equipped guide member in its various vertically adjusted positions with respect to said upstanding structural member; and Figure 6 is a fragmentary rear view of the roller equipped guide member, parts being broken away and other parts being shown in section in order further to illustrate the construction and design of the means for releasably locking or securing the guide member in the various positions into which it is adjusted.

The seat structure which is shown in the drawings constitutes the preferred embodiment of the invention. It is illustrated in connection with an airplane A, serves as a support for one of the operators of the airplane and comprises a seat 7 and a mount 8 for the seat. The airplane A is of conventional or standard design and comprises a fuselage $a$ with a cockpit $a^1$ in the aft portion thereof. The fuselage is in the form of a framework $a^2$ and a skin $a^3$ around the framework. The skin has an opening $a^4$ above the cockpit $a^1$ in order to provide visibility and maneuverability for the occupant of the cockpit. The framework $a^2$ comprises an upper longéron $a^5$, a lower longéron $a^6$ of sectional design, and a plurality of upstanding structural members $a^7$, $a^8$ and $a^9$ between the upper and lower longérons. The aforementioned longérons and the structural members are located at one side of the fuselage. The framework $a^2$ is provided with similar longérons and structural members (not shown) at the other side of the fuselage and these are suitably connected in place. The lower longéron $a^6$ of the framework $a^2$ comprises a forward section $a^{10}$ and an aft section $a^{11}$. The adjacent ends of these two sections are connected together by a plate $a^{12}$. The structural member $a^7$ is in the form of a tube of circular cross section and extends upwardly and forwardly at an angle of approximately 70° with respect to the horizontal. It extends between the upper and lower longérons $a^5$ and $a^6$ and is fixedly secured at its lower end to the plate $a^{12}$. The structural member $a^8$ extends upwardly and rearwards from the plate $a^{12}$, as shown in Figure 1, and is welded or otherwise fixedly secured at its upper end to the longéron $a^5$. The structural member $a^9$ is located behind the member $a^8$. It extends upwardly and forwardly in parallel relation with the member $a^7$ and extends between, and is welded to, the upper and lower longérons $a^5$ and $a^6$. The framework $a^2$ constitutes an internal support for the skin $a^3$. In addition to the fuselage $a$ the airplane A has an empennage, a wing structure, and an engine driven propeller (all not shown).

The seat 7 of the improved seat structure is located or disposed in the cockpit $a^1$ of the airplane A and as hereinafter described, is carried by the mount 8 so that it is bodily rotatable about a vertical axis into different positions and is also vertically adjustable. It is in the form of a shell of aluminum or other light material and embodies a substantially flat bottom 9, a back 10 and a pair of sides 11. The sides extend upwardly from the sides of the seat bottom 9 and are joined to the back 10. They serve to reinforce the back and are cut away at the upper front portions thereof so as to provide ample or adequate arm room for the user of the seat.

The mount 8 of the seat structure comprises an elongated horizontally extending bracket 12. The latter is of tubular design and underlies the seat 7, as shown in Figure 2. It extends transversely of the cockpit from the central portion of the seat bottom 9 toward the upwardly and forwardly extending tubular structural member $a^7$ of the fuselage framework $a^2$ and has at its inner end a bearing 13. This bearing is preferably in the form of a casting of aluminum or other light material and is arranged so that the axis thereof extends vertically. It is downwardly tapered as shown in Figure 3 and has at the upper end thereof an integral outwardly extending annular flange 14. The bottom 9 of the seat 7 is provided with a depending downwardly tapered spindle 15 and this fits and is journalled in the bearing 13 and forms with the latter a pivotal connection whereby the seat 7 is permitted to turn or rotate about a substantially vertical axis. The lower or small end of the spindle 15 terminates in an externally threaded extension 16 and this projects beneath the lower end of the bearing 13 and carries a nut 17 which abuts said lower end of the bearing 13 and serves to hold the spindle 15 and the seat 7 against vertical displacement with respect to the bearing. The upper end of the spindle 15 is fixedly connected to the front central portion of the seat bottom 9 by way of a bracket structure 18. The latter constitutes a part of the seat 7 and is suitably secured in place.

In order releasably to lock or secure the seat 7 of the structure in the various positions into which it is turned or rotated a U-shaped lever 19 and a lock pin 20 are provided. The lever 19 is located in front of the spindle 15 and is positioned or arranged so that the central portion thereof underlies the front of the seat bottom and its ends lap the front portions of the sides 11 of the seat. Said central portion of the U-shaped lever 19 is pivotally connected to the front end of the bracket structure 18 so that the lever is free to swing forwards and rearwards about a horizontal axis. The ends of the lever extend rearwards and upwards, as shown in Figure 3, and terminate in handles or grips 21. The pin 20 overlies the annular flange 14 at the upper end of the bearing 13 and extends substantially vertically when in its normal or locking position. It is fixedly connected to the central portion of the lever 19 by a lug 22. The latter projects radially and rearwardly from the central portion of the lever and is in the form of an eye. It extends around the central portion of the lock pin 20 and is preferably formed as an integral part of the lever 19. When the lever is swung forwards the lock pin 20 is raised and when it is swung rearwards and downwards the lock pin is lowered. The lower end of the pin 20 is tapered and is adapted to coact with a plurality of holes 23 in the flange 14 to lock the seat against rotation relatively to the bearing 13. The holes 23 are preferably four in number and these are arranged one in the front portion of the flange, another in the rear portion of the flange and the remaining two in the side portions of the flange, one diametrically opposite the other. When the lower end of the pin 20 is in any one of the holes 23 the seat is locked against rotation. The four holes 23 permit the seat to be locked in a position facing forwards, a position facing rearwards and a position facing to either side of the cockpit. To release the seat 7 so that it may be turned into a different position it is only necessary to swing the lever 19 forwards. This causes the pin 20 to be moved out of seated relation with the subjacent hole 23 in the flange 14 and frees the seat for rotative movement. The lock pin 20 is urged into its operative position, i. e., in seated relation with one of the holes 23 by way of a compression spring 24. This spring surrounds the upper end of the pin 20 and fits between the upper end of the lug 22 and the subjacent or superincumbent portion of the bottom 9 of the seat. The lever 19 and the pin 20 together with the holes 23 in the flange 14 constitute simple means controllable or operable from the sides of the seat for releasably locking the seat in the various positions into which it is turned or rotated.

The outer end of the tubular horizontally extending bracket 12 of the mount 8 is provided with a guide member 25 and this straddles, and is vertically slidable on the structural member $a^7$. When the member 25 is slid upwards on the structural member $a^7$ the bracket 12 and the seat 7 are moved into a raised position in the cockpit and when the member 25 is slid downwards on the structural member $a^7$ the bracket and seat are lowered. As shown more particularly in Figures 2, 4 and 5 of the drawings the guide member 25 at the outer end of the tubular bracket 12 consists of a pair of similarly shaped laterally spaced plates 26, a pair of opposed upper rollers 27 and a pair of opposed or laterally spaced lower rollers 28. The upper rollers 27 are mounted on spindles 29 and engage diametrically opposite portions of the structural member $a^7$. They taper inwardly from their ends and serve together with the lower rollers 28 to hold the plates 26 of the member 25 in laterally spaced relation. The lower rollers 28 are disposed beneath the upper rollers and engage diametrically opposite portions of the structural member $a^7$. They are mounted on spindles 30 and coact with the upper rollers to prevent tilting of the guide member 25 relatively to the structural member $a^7$ while at the same time permitting said member 25 to slide with a minimum amount of friction longitudinally of said structural member. The central portions of the lower rollers are dished or inwardly tapered in order that they conform to the outer periphery of the structural member $a^7$. The outer end of the tubular bracket 12 fits between, and is suitably secured to, the inner portions of the plates 26. As shown in Figures 2 and 3 the rearwardly and upwardly inclined structural member $a^7$ of the fuselage framework $a^2$ is provided at the rear portion thereof with a longitudinal series of vertically and equidistantly spaced holes 31. These holes together with a lock pin 32 serve as means for releasably locking or securing the guide member 25 in the various positions into which it is slid or shifted on the structural member $a^7$. The lock pin 31 is associated with the member 25 and is located adjacent, and is movable to and from, the rear portion of the structural member $a^7$. It is housed within a bracket 33 on the rearmost plate 26 and is provided with a shift lever 34. The bracket 33 is bolted or otherwise secured to the rearmost plate 26 and embodies a rear wall 35 and a side wall 36. The pin 32 extends at right angles to the structural member $a^7$ and has the rear end thereof of reduced thickness. Such rear end of the pin fits slidably within a hole 37 in the rear wall 35 of the bracket 33. The front end of the lock pin 32 fits slidably within a hole 38 in the rearmost plate 26 and is adapted when the pin is shifted forwards as hereinafter described, to enter the adjacent hole 31 in the structural member $a^7$ and thus lock the guide member 25 of the mount 8 to said structural member. The shift lever 34 is fixedly connected to the inner portion of the reduced rear end of the lock pin 32 and extends radially therefrom. It projects through a cam type slot 39 in the side wall 36 of the bracket 33 and embodies a knob 40 at its outer end. The slot 39 extends diagonally and due to its arrangement and position controls the shift lever 34 in such manner that when the lever is shifted upwards the lever together with the lock pin 32 is shifted forwards and when the lever is swung downwards the lever together with the lock pin is shifted rearwards. Forward movement of the lock pin 32 renders the pin operative, as heretofore pointed out, and rearward movement or retraction of the pin renders the pin inoperative. A compression spring 41 surrounds the reduced rear end of the lock pin. It abuts against the rear wall 35 of the bracket 33 and serves to urge the pin into its locking or operative position. The shift lever 34 extends in the direction of the seat and is within reach of, and readily manipulable by, the user of the seat. When it is desired to release the guide member 25 in connection with vertical adjustment of the seat 7 the user grips the knob 40 and swings the shift lever 34 downwards. This, as heretofore pointed out, retracts the lock pin 32 and thus frees the member 25 so that it may be slid upwards or downwards on the structural member $a^7$. When the seat is adjusted vertically to the desired height the user swings the lever 34 upwards. This results in the pin 32 being shifted forwards into interfitting relation with the adjacent hole 31 in the structural member $a^7$. The holes 31 and the lock pin 32 together with the shift lever 34 and the bracket 33 constitute simple means for releasably locking the member 25 in its various adjusted positions.

The guide member 25 of the mount 8 is held against rotary movement with respect to the structural member $a^7$ by a pair of torque arms 42. These arms are disposed one above the other, as shown in the drawings, and are arranged in V fashion or formation directly beneath the bottom 9 of the seat 7. The lower end of the lower torque arm is pivotally connected to a bracket 43 on the lower end of the structural member $a^7$. The upper end of the upper torque arm extends between and is pivotally connected to the inner lower corners of the plates 26 of the guide member 25. The lower end of the upper torque arm is pivotally connected to the upper end of the lower torque arm, as shown in Figures 1 and 2. The two torque arms permit the member 25 to slide lengthwise of the structural member $a^7$ and prevent the guide member from rotating around or relatively to said structural member. By reason of the fact that the torque arms 42 are disposed beneath the bottom of the seat 7 they do not in any way interfere with movement of the feet of the user of the seat.

In order to facilitate vertical adjustment of the seat 7, especially when the seat is occupied, two elastic cords 44 and 45 are provided. These cords are under such tension that they operate when the lock pin 32 is shifted rearwards into its inoperative position to counteract the weight of the seat and the user of the seat and thus prevent the seat and user from dropping to the bottom of the cockpit $a^1$. The cord 44 is anchored at one end thereof to the upper outer corner of the rearmost plate 26. From its point of anchor the cord 44 extends upwards and forwards along the outer portion of the structural member $a^7$, then around a sheave 46 on the upper end of said structural member $a^7$, then along and parallel to the upper longeron $a^5$ of the fuselage framework $a^2$, then around a sheave 47 on the upper end of the upstanding structural member $a^8$, and then downwards and rearwards along the structural member $a^9$ to an anchor element 48. The elastic cord 45 is anchored to the upper outer corner of the foremost plate 26 and from the point of anchor extends upwards along the outer portion of the structural member $a^7$, then around a sheave 49 on the upper end of said structural member $a^7$, then downwards and forwards to a sheave 50 on the forward section $a^{10}$ of the lower longeron $a^6$ and around said sheave 50 and then rearwards along the front section $a^{10}$ to an anchor element $51$ adjacent the plate $a^{12}$.

When the user of the seat $7$ is facing forwardly and desires to face rearwards either for observation purposes or to be in a position to manipulate or fire a machine gun he grasps either end of the U-shaped lever $19$ and swings the lever upwards and forwards. This action on the part of the user of the seat withdraws the pin $20$ from the hole $23$ in the front portion of the flange $14$. Upon withdrawal of the pin from the aforementioned hole the seat $7$ is free and hence may be turned by the user into a position wherein it faces rearwards. When the seat is substantially at an angle of 180° from its original forwardly facing position the user releases the lever $19$ and then by a slight turning movement in either direction brings the lower end of the pin $20$ into registry with the hole $23$ in the rear portion of the flange $14$. As soon as such registry is effected the spring $24$ operates to snap the pin $20$ downwards into locked relation with the aforementioned hole. Should the user desire to raise the seat it is only necessary for him to grasp the handle $40$ and swing the shift lever $34$ downwards. This operation, as hereinbefore pointed out, causes the shift lever to move the lock pin $32$ into its retracted or inoperative position. As soon as the pin is in such position the user of the seat raises himself to the desired height. During such operation the seat $7$ is elevated as the result of the operation of the elastic cords $44$ and $45$. When the seat is at the desired elevation the user of the seat releases the shift lever $34$ and then adjusts the seat up and down to a slight extent until the forward end of the pin is brought into registry with one of the holes $31$. As soon as the forward or large end of the pin is brought into registry with one of the aforementioned holes the compression spring $41$ around the rear end of the lock pin $32$ shifts the pin forwards into interfitting relation with the hole.

The herein described seat structure is essentially of simple design and construction and hence is light and may be manufactured at a comparatively low cost. It is durable and may be readily adjusted vertically or rotated bodily so as to face forwards, rearwards or sidewards. By reason of the fact that the seat $7$ of the structure is supported from one side of the cockpit only the user of the seat has free leg room at the other side of the cockpit and hence may quickly and readily turn the seat from a forwardly facing position to a rearwardly facing position or vice versa.

The invention is not to be understood as restricted to the details set forth since these may be modified within the scope of the appended claims without departing from the spirit and scope of the invention.

Having thus described the invention what I claim as new and desire to secure by Letters Patent is:

1. In combination with an airplane having a cockpit with a fixed upstanding structural member therein, a seat structure comprising a seat in the cockpit, and a single elongated rigid horizontal bracket extending between the bottom of the seat and the member and having one end thereof pivotally connected to the seat bottom so that the seat is rotatable bodily about a substantially vertical axis and its other end slidably connected to the member so that the bracket together with the seat is adjustable up and down, said bracket having releasable means at its said other end for locking it in its various adjusted positions and serving together with said releasable means and the structural member as the sole supporting medium for the seat.

2. In combination with an airplane having a fuselage with a cockpit therein and a fixed upstanding structural member at one side of the cockpit, a seat structure comprising a seat disposed in the central portion of the cockpit and substantially transversely aligned with said member, and a single elongated rigid horizontal bracket extending transversely of the cockpit between the bottom of the seat and the member and having one end thereof pivotally connected to the seat bottom so that the seat is rotatable bodily about a substantially vertical axis and its other end slidably connected to the member so that the bracket together with the seat is adjustable up and down, said bracket embodying releasable means at its said other end and within reach from the seat for locking it in its various adjusted positions with respect to the structural member and constituting in conjunction with said means and structural member the sole means for supporting the seat.

3. In combination with an airplane having a cockpit with a fixed upstanding structural member therein, a seat structure comprising a seat in the cockpit, and single elongated horizontally extending bracket between the seat and the member and having one end thereof connected to the seat and its other end slidably mounted on the member so that the bracket together with the seat is adjustable up and down, said bracket being provided at its said other end with releasable means within reach from the seat for locking it in its various adjusted positions with respect to the structural member and serving with said means and member as the sole supporting means for the seat.

4. In combination with an airplane having a cockpit with a fixed upwardly and forwardly inclined structural member at one side of the cockpit, a seat structure comprising a seat disposed in the central portion of the cockpit and substantially transversely aligned with said member, an elongated horizontal bracket extending transversely of the cockpit and between the bottom of the seat and the member and having one end thereof connected to the seat bottom and its other end slidably mounted on the member so that the bracket together with the seat is adjustable up and down, and releasable means mounted on said other end of the bracket and within reach from the seat for securing or locking the bracket in its various adjusted positions with respect to the structural member.

5. In combination with an airplane having a cockpit with a fixed upstanding structural member therein, a seat structure forming a part of the airplane and comprising a seat in the cockpit, an elongated rigid substantially horizontally extending bracket between the seat and the member, having one end thereof connected to the seat and having at its other end a hollow guide member around the structural member provided with rollers in engagement with said structural member and mounted by way of said rollers for longitudinal sliding movement on the member so that the structural bracket together with the seat is adjustable up and down, and releasable means on the guide member and within reach from the seat for locking or securing the bracket in its various adjusted positions with respect to the structural member, 6. In combination with an airplane having a fuselage with a cockpit and a framework around the cockpit and including an upstanding structural member, a seat structure comprising a seat in the cockpit, an elongated horizontally extending bracket between the bottom of the seat and the structural member having one end thereof connected to the seat bottom and provided at its other end with a guide member mounted for longitudinal sliding movement on the structural member and serving to permit the bracket together with the seat to be adjusted up and down, and a pair of torque arms connected pivotally together and also connected one pivotally to the guide member and the other pivotally to the frame work and serving to prevent rotation of the guide member relatively to said structural member while at the same time permitting sliding movement of the one member relatively to the other.

7. In combination with an airplane having a fuselage with a cockpit and a frame work around the cockpit and including an upstanding structural member, a seat structure comprising a seat in the cockpit, an elongated horizontally extending bracket between the seat and the member having one end thereof pivotally connected to the seat bottom so that the seat is rotatable bodily about a substantially vertical axis, and provided at its other end with a guide member mounted for longitudinal sliding movement on the structural member and serving to permit the bracket together with the seat to be adjusted up and down, and a pair of superposed coacting torque arms beneath the seat connected pivotally together and also connected the upper pivotally to the guide member and the lower pivotally to the bottom portion of the frame work, and serving to prevent rotation of the guide member and bracket relatively to said structural member while at the same time permitting sliding movement of said guide member.

8. In combination with an airplane having a fuselage with a cockpit therein and a framework around the cockpit and including an upstanding tubular member, a seat structure comprising a seat disposed in the cockpit, an elongated horizontally extending bracket having one end thereof connected to the bottom of the seat and provided at its other end with a roller-equipped guide member mounted for longitudinal sliding movement on the tubular member and serving to permit the bracket together with the seat to be raised or lowered, releasable means mounted on the guide member and controllable from the seat for locking or securing the guide member in different adjusted positions relatively to the tubular member, and a pair of coacting torque arms disposed beneath the seat and connected pivotally together and also connected one pivotally to the guide member and the other pivotally to the framework and serving to prevent rotation of the guide member relatively to the tubular member while at the same time permitting sliding movement of the guide member relatively to said tubular member.

9. In combination with an airplane having a cockpit with an upstanding structural member at one side thereof, a seat structure comprising a seat disposed in the central portion of the cockpit and substantially transversely aligned with the member, an elongated bracket having one end thereof connected to the seat and provided at its other end with a guide member mounted for longitudinal sliding movement on the structural member and serving to permit the bracket together with the seat to be adjusted up and down, means associated with the guide member for releasably locking the member in place, and a pair of elastic cords extending one upwardly and forwardly from the guide member and the other upwardly and rearwardly, and arranged and designed so that they urge the bracket and seat upwards upon release of said means.

10. In combination with a vehicle having a cockpit therein, a seat structure associated with and forming a part of the vehicle and comprising a seat in the cockpit, a mount under the seat for supporting the latter so that it is bodily rotatable, and means for releasably locking the seat against turning movement relatively to the mount including a U-shaped rock type lever extending around the bottom of the seat and having the ends thereof terminating adjacent the sides of the seat.

11. In combination with an airplane having a cockpit with a fixed upstanding structural member therein, a seat structure comprising a seat in the cockpit, an elongated horizontal bracket extending between the bottom of the seat and the member and having one end thereof pivotally connected to the seat bottom so that the seat is rotatable bodily about a substantially vertical axis and its other end slidably connected to the member so that the bracket together with the seat is adjustable up and down, releasable means controllable from the seat for locking the seat against rotation relatively to the bracket and releasable means also controllable from the seat for locking the bracket in its various adjusted positions with respect to the structural member.

GEORGE W. O'HARE.